United States Patent
Zhou et al.

(10) Patent No.: US 11,568,111 B2
(45) Date of Patent: Jan. 31, 2023

(54) NUMERICAL SIMULATION METHOD FOR PROPPANT TRANSPORT CONSIDERING WALL-RETARDATION EFFECT

(71) Applicant: Southwest Petroleum University, Chengdu (CN)

(72) Inventors: Hangyu Zhou, Chengdu (CN); Jianchun Guo, Chengdu (CN); Tao Zhang, Chengdu (CN); Kun Sun, Chengdu (CN); Mingyong Zeng, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/825,264

(22) Filed: May 26, 2022

(65) Prior Publication Data

US 2022/0391567 A1 Dec. 8, 2022

(30) Foreign Application Priority Data

Jun. 8, 2021 (CN) .......................... 202110638210.3

(51) Int. Cl.
*G06F 30/28* (2020.01)
*G06F 119/14* (2020.01)
*G06F 111/10* (2020.01)

(52) U.S. Cl.
CPC .......... *G06F 30/28* (2020.01); *G06F 2111/10* (2020.01); *G06F 2119/14* (2020.01)

(58) Field of Classification Search
CPC ... G06F 30/28; G06F 2111/10; G06F 2119/14
See application file for complete search history.

(56) References Cited

U.S. PATENT DOCUMENTS

2015/0060058 A1\* 3/2015 Morris .................... E21B 43/26
166/250.02
2018/0252102 A1\* 9/2018 Anschutz .............. E21B 49/081

FOREIGN PATENT DOCUMENTS

| CN | 102575510 A | 7/2012 |
| CN | 109446706 A | 3/2019 |

(Continued)

OTHER PUBLICATIONS

Xu Huang et al., "Numerical Study of Wall Roughness Effect on Proppant Transport in Complex Fracture Geometry," SPE-183818-MS pp. 1-16 (Year: 2017).\*

*Primary Examiner* — Steven W Crabb

(57) ABSTRACT

The present invention discloses a numerical simulation method for proppant transport considering wall-retardation effect, comprising the followings: establish a physical model of laboratory experiment on proppant transport with a large flat-panel device; establish a drag coefficient model considering wall-retardation effect according to the numerical simulation experiment; establish a computational geometric model; set boundary conditions and physical parameters of the geometric model according to the two-fluid simulation method for solid proppant quasi-fluidization; verify the grid independence of the computational geometric model to obtain the transport characteristics and placement pattern of the proppant in fractures. The present invention employs a numerical simulation method to study the migration and distribution patterns of proppant under the retardation effect of narrow walls during the hydraulic fracturing. The method is reliable in principle and can accurately predict proppant transport in subsurface hydraulic fractures with consideration of the wall-retardation effect on proppant transport.

4 Claims, 3 Drawing Sheets

(56) References Cited

FOREIGN PATENT DOCUMENTS

CN 111173489 A 5/2020
WO WO-2015031527 A1 * 3/2015 ........... E21B 43/267

* cited by examiner

NUMERICAL SIMULATION METHOD FOR PROPPANT TRANSPORT CONSIDERING WALL-RETARDATION EFFECT

CROSS-REFERENCE TO RELATED APPLICATIONS

The application claims priority to Chinese patent application No. 202110638210.3, filed on Jun. 8, 2021, the entire contents of which are incorporated herein by reference.

TECHNICAL FIELD

The present invention relates to a numerical simulation method for proppant transport considering wall-retardation effect, pertaining to the field of oil and gas field development engineering.

BACKGROUND

According to data from the National Bureau of Statistics, the productions of crude oil and natural gas in China in 2019 were 1.91×108 t and 1,761.70×108 m3 respectively, with foreign-trade dependence as high as 73.8% and 47.7% respectively, making the energy security become increasingly serious and critical. Unconventional oil and gas resources such as tight oil and gas and shale oil and gas account for half of remaining oil and gas resources in China, and are an important strategic alternative for the national energy demand. In addition, hydraulic fracturing is one of the "three powerful tools" for effective stimulation and development of such oil and gas resources. With hydraulic fracturing technology, high-pressure fluid carrying proppant is used to build a subsurface "highway" for oil and gas flow, increasing the area of oil and gas discharge, reducing the differential pressure of fluid flow in the formation, and effectively improving the productivity of oil and gas wells. The establishment of long-term effective flow channels in fractures is one of the key elements of successful fracturing. Therefore, the migration and distribution patterns of proppant in the fractures are crucial to the construction effect. For unconventional oil and gas reservoirs represented by shale, the width of subsurface hydraulic fractures generally varies from a few millimeters to one centimeter. The solid volume ratio of the proppant slug in sand-carrying fluid with the lowest sand concentration used in construction is much greater than 1‰. The migration and settlement of proppant in fractures with sand-carrying fluid is related to dense liquid-solid flow in narrow space. Therefore, the fracture wall plays an important role in the transport of proppant. In the laboratory experiments on proppant transport with a large flat-panel device, it is found that the horizontal velocity of the particles near the wall is significantly lower than that of the particles gradually approaching the center of the fracture width, which is due to the increased drag of the particles near the wall and the slow settling in the longitudinal direction, but also increases the resistance to fluid flow and the weakened ability of the particles to move in the lateral direction, which is manifested as the retardation of the proppant particles by the wall. This is manifested in the retardation effect of the wall on proppant particles. In order to break the limitations of physical simulation experiments in terms of scale, cost and operation conditions by means of numerical simulation and then accurately predict the transport of proppant in subsurface hydraulic fractures, the simulation model needs to be refined and improved. However, the influence of narrow walls on proppant transport is ignored in the existing inventive technologies, which easily leads to deviations in the understanding of proppant migration laws and placement patterns, and affects the design and construction effect of hydraulic fracturing in unconventional oil and gas reservoirs.

SUMMARY

In order to overcome the problems in the prior art, the present invention provides a numerical simulation method for proppant transport considering wall-retardation effect.

The technical solution provided by the present invention to solve the above technical problem is a numerical simulation method for proppant transport considering wall-retardation effect, comprising the following steps:

Step 1: Establish a physical model of laboratory experiment on proppant transport with a large flat-panel device, of which the size is 4 m by 0.3 m by 0.01 m (length×height×width);

Step 2: Establish a drag coefficient model considering wall-retardation effect according to the numerical simulation experiment;

Step 3: Establish a computational geometric model according to the parameters of the drag coefficient model and the physical model of laboratory experiment on proppant transport with a large flat-panel device;

Step 4: Set boundary conditions and physical parameters of the computational geometric model according to the two-fluid simulation method for solid proppant quasi-fluidization;

Step 5: Verify the grid independence of the computational geometric model to eliminate the influence of grid subdivision on the calculation results, and finally, simulate the transport process of proppant in the narrow fracture with the computational geometric model to obtain the transportation characteristics and placement pattern of the proppant in fractures.

A further technical solution is that the drag coefficient model considering wall-retardation effect in Step 1 is as follows:

When $H/d \geq 2$,
$$C_D = 1.671 \left[ \frac{24}{\alpha_1 Re_s} [1 + 0.15(\alpha_1 Re_s)^{0.687}] + \frac{0.42}{1 + 4.25 \times 10^4 (\alpha_1 Re_s)^{-1.16}} \right] (H/d)^{-0.565} ;$$

When $H/d < 2$,
$$C_D = \frac{24}{\alpha_1 Re_s} [1 + 0.15(\alpha_1 Re_s)^{0.687}] + \frac{0.42}{1 + 4.25 \times 10^4 (\alpha_1 Re_s)^{-1.16}}$$

Where, $C_D$ is the drag coefficient; $\alpha_l$ is the liquid volume fraction; $Re_s$ is the particle Reynolds number; H is the particle-to-boundary distance; d is the particle size.

The further technical solution is that Step 3 comprises the following sub-steps:

1) Approximately substitute the distance H from grid center to boundary for the distance from particles in all positions in the grid to boundary, and save the value in the grid center;

2) Traverse all grids, determine the relationship between the $H_i/d$ of $i^{th}$ grid and 2, and decide which drag coefficient calculation formula is used for the solid particles in the current grid;

3) Update the value of H/d on the surface center grid of the boundary.

The further technical solution is that Step 5 comprises the following sub-steps:

1) Construct a long and narrow fracture flow space, with given specific fracture length, height and width, and determine the initial grid aspect ratio in the length, height and width directions;

2) Refine the boundary by scaling the grid, and compare the difference between the calculation results before and after refinement; if there is no difference, no further refinement is required; otherwise, the number of grids shall be further increased for refinement;

3) Increase the number of grids in the width direction, as well as the number of grids in the length and height directions to reduce the aspect ratio of the grid and improve the quality of the grid; compare the calculation results before and after refinement; if there is no difference, a grid-independent geometric model is obtained.

A further technical solution is that the initial grid scale in the length, width, and height directions of the computational geometric model are 0.01 m, 0.001 m, and 0.01 m respectively, which means the initial number of grids in three directions are 400, 10 and 30, i.e., the initial grid aspect ratio is 10 in the length and height directions, and 1 in the width direction.

The present invention has the following beneficial effects: the present invention employs a numerical simulation method to study the migration and distribution patterns of proppant under the influence of narrow walls during the hydraulic fracturing; the method is reliable in principle and can accurately predict proppant transport in subsurface hydraulic fractures with consideration of the wall-retardation effect on proppant transport. It provides guidance for design and effect evaluation of hydraulic fracturing in unconventional oil and gas reservoirs.

DETAILED DESCRIPTION OF THE EMBODIMENTS

The technical solutions of the present invention will be described expressly and integrally in conjunction with the appended figures. It is clear that the described embodiments are some but not all of the embodiments of the present invention. According to the embodiments of the present invention, all other embodiments obtained by those of ordinary skill in the art without creative effort fall within the protection scope of the present invention.

A numerical simulation method for proppant transport considering wall-retardation effect of the present invention comprises the following steps in sequence:

(1) Establish a physical model of laboratory experiment on proppant transport with a large flat-panel device, of which the size is 4 m by 0.3 m by 0.01 m (length×height× width);

(2) Calculate the drag force of particles under the wall-retardation effect through numerical simulation experiment, and introduce the dimensionless parameter H/d, that is, the ratio of the particle-to-wall distance to the particle size, and obtain a drag coefficient model considering wall-retardation effect by data fitting and correction on the basis of the calculation formula of Clift drag coefficient;

(3) Subdivide the grid of the equivalent scale geometric model by means of sophisticated grid processing software according to the size and structure of the indoor large flat-panel device, and mount the drag coefficient model obtained in Step (2) to the calculation example where the geometric model is utilized;

(4) Select the two-fluid simulation method for quasi-fluidizing the solid proppant, and set the relevant boundary conditions and physical parameters for the calculation example in Step (3);

(5) Verify the grid independence for the complete calculation example in Step (4) to eliminate the influence of grid subdivision on the calculation results, and finally, simulate the transport process of proppant in the narrow fracture with the grid-independent geometric model to obtain the transport characteristics and placement pattern of the proppant in fractures.

Figure 1:
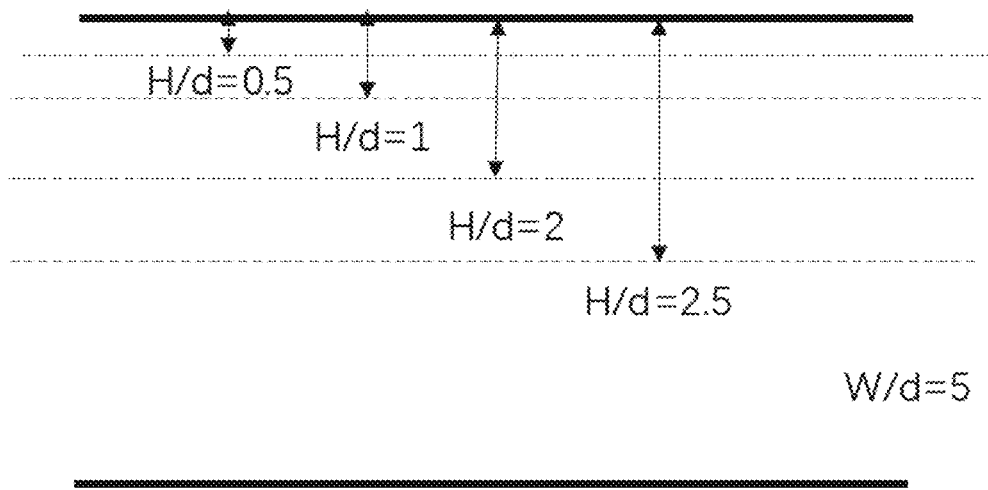
FIG. 1 is a schematic diagram of the different positions of particles from the wall in the present invention.

In Step (1) of the present invention, calculate the drag force of particles under the wall-retardation effect through numerical simulation experiment, and introduce the dimensionless parameter H/d, that is, the ratio of the particle-to-wall distance to the particle size, and obtain a drag coefficient model considering wall-retardation effect by data fitting and correction on the basis of the calculation formula of Clift drag coefficient, comprising the following steps:

1) Calculate the drag force of single particle subjected to from the fluid in infinite space in the mesoscopic scale with the D3Q19 model of the Lattice Boltzmann Method (LBM), and compare the calculated results with published data to ensure the accuracy of the calculation of the drag force on the particle using this method;

2) Add wall boundaries to the calculation domain in Step 1) and calculate the drag force on single particle separately when H/d=0.5, 1, 1.5, 2, 2.5 (as shown in FIG. 1);

3) On the basis of the Clift formula, which can accurately calculate the drag force on the particle over a wide range of particle Reynolds numbers, introduce dimensionless parameter H/d to take into account the wall-retardation effect on particle transport, and substitute the simulation results of the LBM into the formula for fitting, and obtain a new drag force model considering wall-retardation effect; the specific formula is as follows:

$$C_D = 1.671 \left[ \frac{24}{\alpha_1 Re_s} [1 + 0.15 (\alpha_1 Re_s)^{0.687}] + \frac{0.42}{1 + 4.25 \times 10^4 (\alpha_1 Re_s)^{-1.16}} \right] (H/d)^{-0.565} \quad (1)$$

4) Compare the simulation results of the LBM with the calculation results of the Clift formula and make it clear that when H/d≥2, the wall-retardation effect on particles subjected to drag force can be ignored or even disappear, and the drag force model degenerates into Clift formula; the specific formula is as follows:

$$C_D = \frac{24}{\alpha_1 Re_s} [1 + 0.15(\alpha_1 Re_s)^{0.687}] + \frac{0.42}{1 + 4.25 \times 10^4 (\alpha_1 Re_s)^{-1.16}} \quad (2)$$

Where, $C_D$ is the drag coefficient; $\alpha_l$ is the liquid volume fraction; $Re_s$ is the particle Reynolds number; H is the particle-to-boundary distance; d is the particle size.

In the present invention, Step (3) comprises the following sub-steps:

1) Approximately substitute the distance H from grid center to boundary for the distance from particles in all positions in the grid to boundary, and save the value in the grid center;

2) Traverse all grids, determine the relationship between the $H_i/d$ of $i^{th}$ grid and 2, and decide which drag coefficient calculation formula is used for the solid particles in the current grid;

3) Update the value of H/d on the surface center grid of the boundary;

In Step (5) of the present invention, verify the grid independence for the complete calculation example in Step (4) to eliminate the influence of grid subdivision on the calculation results, and finally, simulate the transport process of proppant in the narrow fracture with the grid-independent geometric model to obtain the transport characteristics and placement pattern of the proppant in fractures, comprising the following steps:

1) Construct a long and narrow fracture flow space, with given specific fracture length, height and width, and determine the initial grid aspect ratio (ratio of actual model length to unit grid length) in the length, height and width directions;

2) Refine the boundary by scaling the grid, and compare the difference between the calculation results before and after refinement; if there is no difference, no further refinement is required; otherwise, the number of grids shall be further increased for refinement;

3) Increase the number of grids in the width direction, as well as the number of grids in the length and height directions to reduce the aspect ratio of the grid (the ratio of the longest side to the shortest side of the grid) and improve the quality of the grid; compare the calculation results before and after refinement; if there is no difference, a grid-independent geometric model is obtained.

EMBODIMENTS

Figure 2:
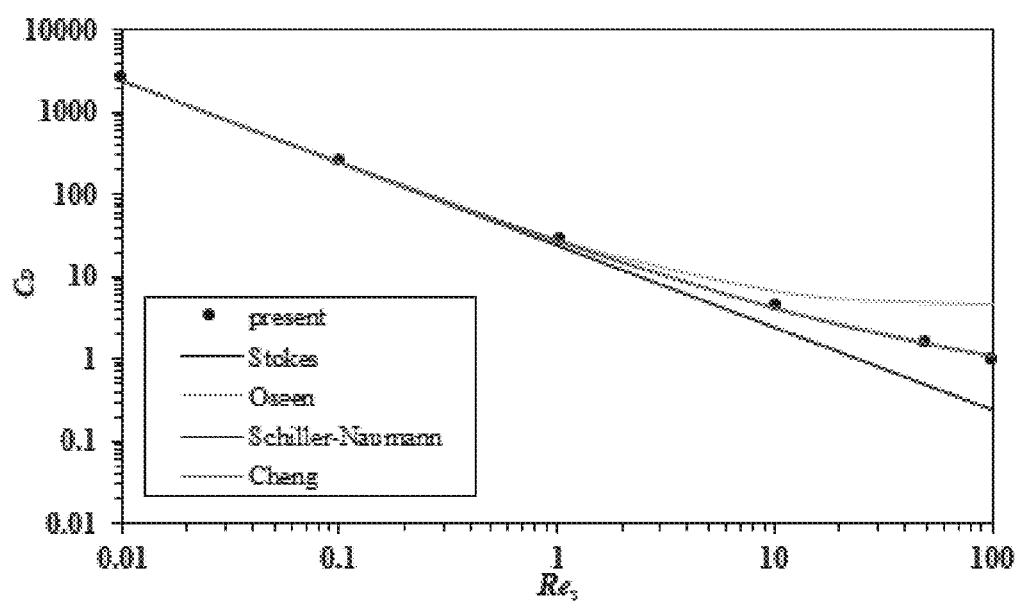
FIG. 2 is a comparison diagram between the calculated and actual results of drag force of single particle in infinite space in the present invention.
Figure 3:
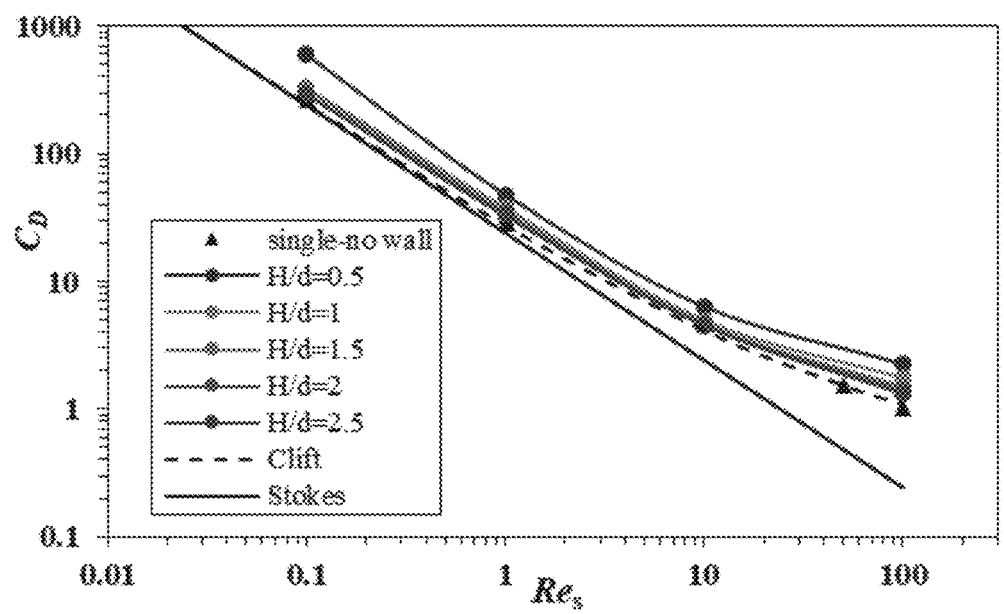
FIG. 3 is a graph of the calculation result of drag force with different particle Reynolds numbers and different particle-to-wall distances in the present invention.

Step 1: Calculate the drag force of single particle subjected to from the fluid in infinite space in the mesoscopic scale with the D3Q19 model of the Lattice Boltzmann Method (LBM), and compare the calculated results with published data, as shown in FIG. 2;

Step 2: Calculate the drag force on single particle at different locations from the wall surface with the method in Step 1, introduce dimensionless parameter H/d on the basis of the Clift formula, which can accurately calculate the drag force on the particle over a wide range of particle Reynolds numbers, and substitute the simulation results into the formula for fitting; the fitting results are shown in FIG. 3;

Step 3: Approximately substitute the distance H from grid center to boundary for the distance from particles in all positions in the grid to boundary, and save the value in the grid center; traverse all grids, determine the relationship between the $H_i/d$ of $i^{th}$ grid and 2, and decide which drag coefficient calculation formula is used for the solid particles in the current grid; update the value of H/d on the surface center grid of the boundary;

Step 4: Subdivide the grid of the equivalent scale geometric model with ICEM grid processing software according to the size and structure of the physical model of laboratory experiment on proppant transport with a large flat-panel device; since fractures are narrow for fluid flow, the initial grid scale in the length, width, and height directions of the computational geometric model are 0.01 m, 0.001 m, and 0.01 m respectively, which means the initial number of grids in three directions are 400, 10 and 30, i.e., the initial grid aspect ratio is 10 in the length and height directions, and 1 in the width direction;

Step 5: Refine the boundary by scaling the grid at a ratio of 1.05, and compare the difference between the calculation results before and after refinement; if there is no difference, no further refinement is required; otherwise, the number of grids shall be further increased for refinement;

Step 6: If the grid needs to be refined by increasing the number of grids, increase the number of grids in the width direction first, and increase the number of grids in the length and height directions to reduce the grid aspect ratio and improve the grid quality; in the consideration of calculation efficiency, the grid aspect ratio in the length and height directions shall not be less than 5, while in the consideration of actual physical conditions, the minimum grid length shall be greater than the particle size; then compare the difference between the calculation results before and after the refinement; if there is no difference, a grid-independent geometric model is obtained.

Step 7: Select a two-fluid simulation method for quasi-fluidizing the solid proppant, set the boundary conditions (Table 1) of the model, and assign the parameters of the model based on experiments and literature recommendations (Table 2);

Step 8: Verify the grid independence for the complete calculation example to eliminate the influence of grid subdivision on the calculation results, and obtain independent grid, as well as the results of proppant transport simulation considering wall-retardation effect.

The above are not intended to limit the present invention in any form. Although the present invention has been disclosed as above with embodiments, it is not intended to limit the present invention. Those skilled in the art, within the scope of the technical solution of the present invention, can use the disclosed technical content to make a few changes or modify the equivalent embodiment with equivalent changes. Within the scope of the technical solution of the present invention, any simple modification, equivalent change and modification made to the above embodiments according to the technical essence of the present invention are still regarded as a part of the technical solution of the present invention.

What is claimed is:

1. A numerical simulation method for proppant transport considering wall-retardation effect, comprising the following steps:

Step 1: Establish a physical model of a laboratory experiment on proppant transport with a large flat-panel device, of which the size is 4 m by 0.3 m by 0.01 m (length×height×width);

Step 2: Calculate a drag force of particles under wall-retardation effect and introduce dimensionless parameter H/d, that is, the ratio of the particle-to-wall distance to the particle size, and obtain a drag coefficient model considering wall-retardation effect;

Step 3: Establish a computational geometric model having a grid, according to parameters of the drag coefficient model and the physical model of the laboratory experiment on proppant transport with a large flat-panel device;

Step 4: Set boundary conditions and physical parameters of the computational geometric model according to two-fluid simulation method for solid proppant quasi-fluidization;

Step 5: Verify if the computational geometric model is independent of the grid to eliminate an influence of any grid subdivision on calculation results of Step 2, and finally, simulate a transport process of proppant in a fracture with the computational geometric model to obtain a transport characteristics and placement pattern of the proppant in fractures;

wherein the drag coefficient model considering wall-retardation effect in Step 1 is as follows:

When $H/d \geq 2$,
$$C_D = 1.671\left[\frac{24}{\alpha_1 Re_s}\left[1 + 0.15(\alpha_1 Re_s)^{0.687}\right] + \frac{0.42}{1 + 4.25 \times 10^4 (\alpha_1 Re_s)^{-1.16}}\right](H/d)^{-0.565}$$

When $H/d < 2$,
$$C_D = \frac{24}{\alpha_1 Re_s}\left[1 + 0.15(\alpha_1 Re_s)^{0.687}\right] + \frac{0.42}{1 + 4.25 \times 10^4 (\alpha_1 Re_s)^{-1.16}}$$
;

Where, $C_D$ is the drag coefficient; $\alpha_1$ is the liquid volume fraction; $Re_s$ is the particle Reynolds number; H is the particle-to-boundary distance; d is the particle size.

2. The numerical simulation method for proppant transport considering wall-retardation effect according to claim 1, wherein Step 3 comprises the following sub-steps:

1) substitute a distance H from grid center to boundary for the distance from particles in all positions in the grid to boundary, and save a value in the grid center;

2) Traverse all grids, determine a relationship between the $H_i/d$ of $i^{th}$ grid and 2, and determine a drag coefficient calculation formula that is used for solid particles in a current grid;

3) Update the value of H/d on a surface center grid of the boundary.

3. The numerical simulation method for proppant transport considering wall-retardation effect according to claim 1, wherein Step 5 comprises the following sub-steps:

1) Construct an elongated fracture flow space, with a given specific fracture length, height and width, and determine the initial grid aspect ratio in the length, height and width directions;

2) Refine the boundary conditions by scaling the grid, and compare the difference between the determined results before and after the refinement; if there is no difference, no further refinement is required; otherwise, the number of grids shall be further increased for refinement;

3) Increase the number of grids in the width direction, as well as the number of grids in the length and height directions to reduce the aspect ratio of the grid and improve the quality of the grid; compare the calculation results before and after the refinement; if there is no difference, a grid-independent geometric model is obtained.

4. The numerical simulation method for proppant transport considering wall-retardation effect according to claim 3, wherein initial a grid scale in the length, width, and height directions of the computational geometric model are 0.01 m, 0.001 m, and 0.01 m respectively, which means an initial number of grids in three directions are 400, 10 and 30, i.e., an initial grid aspect ratio is 10 in the length and height directions, and 1 in the width direction.

* * * * *